United States Patent
Lou et al.

(10) Patent No.: US 11,187,123 B1
(45) Date of Patent: Nov. 30, 2021

(54) METHOD FOR CONTROLLING EXHAUST AFTER-TREATMENT SYSTEM BASED ON $NO_2$ MEDIUM ADJUSTMENT

(71) Applicant: TONGJI UNIVERSITY, Shanghai (CN)

(72) Inventors: Diming Lou, Shanghai (CN); Yunhua Zhang, Shanghai (CN); Piqiang Tan, Shanghai (CN); Zhiyuan Hu, Shanghai (CN); Liang Fang, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 0 days.

(21) Appl. No.: 17/229,801

(22) Filed: Apr. 13, 2021

(30) Foreign Application Priority Data

Oct. 29, 2020 (CN) .......................... 202011181077.5

(51) Int. Cl.
*F01N 3/00* (2006.01)
*F01N 3/035* (2006.01)
(Continued)

(52) U.S. Cl.
CPC ........... *F01N 3/035* (2013.01); *F01N 3/0231* (2013.01); *F01N 3/2066* (2013.01);
(Continued)

(58) Field of Classification Search
CPC ...... F01N 3/035; F01N 3/0231; F01N 3/2066; F01N 2560/026; F01N 2250/02; F01N 2900/1621; F01N 2570/14
(Continued)

(56) References Cited

U.S. PATENT DOCUMENTS

| 8,833,062 B1 * | 9/2014 | Andreasson | ............ F01N 3/106 60/295 |
| 8,850,802 B1 * | 10/2014 | Andreasson | ............ F01N 3/106 60/295 |

(Continued)

FOREIGN PATENT DOCUMENTS

CN 106837488 B 6/2017

*Primary Examiner* — Jason D Shanske
(74) *Attorney, Agent, or Firm* — True Shepherd LLC; Andrew C. Cheng

(57) ABSTRACT

A method for controlling an exhaust after-treatment system based on $NO_2$ medium adjustment includes the following steps: creating a diesel oxidation catalyst (DOC) reaction map, a diesel particulate filter (DPF) reaction map, and a selective catalytic reduction (SCR) reaction map; obtaining an SCR reaction temperature, desired SCR reaction efficiency, and obtaining $NO_2$ demand according to the SCR reaction map; obtaining a DPF reaction temperature and differential pressure, and obtaining $NO_2$ consumption from the DPF reaction map; obtaining $NO_2$ production, and calculating $NO_2$ input for SCR; if the $NO_2$ input is not equal to the $NO_2$ demand, calculating target $NO_2$ production, obtaining a target DOC reaction temperature corresponding to the target $NO_2$ production from the DOC reaction map, and adjusting a fuel injection rate so that the DOC reaction temperature is equal to the target DOC reaction temperature.

10 Claims, 2 Drawing Sheets

(51) Int. Cl.
*F01N 3/023* (2006.01)
*F01N 3/20* (2006.01)

(52) U.S. Cl.
CPC ...... *F01N 2250/02* (2013.01); *F01N 2430/08* (2013.01); *F01N 2560/026* (2013.01); *F01N 2560/06* (2013.01); *F01N 2560/08* (2013.01); *F01N 2570/14* (2013.01); *F01N 2900/1406* (2013.01); *F01N 2900/1602* (2013.01); *F01N 2900/1621* (2013.01)

(58) Field of Classification Search
USPC .......................................................... 60/297
See application file for complete search history.

(56) References Cited

U.S. PATENT DOCUMENTS

| | | | |
|---|---|---|---|
| 8,966,880 B2 | 3/2015 | Gerty | |
| 9,180,409 B2 | 11/2015 | Pfister | |
| 9,594,067 B2 | 3/2017 | Gerty | |
| 2010/0024397 A1* | 2/2010 | Chi | F01N 3/106 60/285 |
| 2010/0101213 A1* | 4/2010 | Tuomivaara | F01N 3/2053 60/276 |
| 2010/0269492 A1* | 10/2010 | Kotrba | F01N 3/0842 60/297 |
| 2012/0186226 A1* | 7/2012 | Ren | F01N 9/00 60/274 |

* cited by examiner

METHOD FOR CONTROLLING EXHAUST AFTER-TREATMENT SYSTEM BASED ON $NO_2$ MEDIUM ADJUSTMENT

CROSS-REFERENCE TO RELATED APPLICATIONS

This application claims priority to Chinese Patent Application No. 202011181077.5 with a filing date of Oct. 29, 2020. The content of the aforementioned application, including any intervening amendments thereto, is incorporated herein by reference.

TECHNICAL FIELD

The present disclosure relates to the field of engine exhaust treatment, and in particular, to a method for controlling an exhaust after-treatment system based on $NO_2$ medium adjustment.

BACKGROUND

Diesel particulate filter and selective catalytic reduction are the most effective ways to synergistically reduce diesel particulate matter (PM) and nitrogen oxides ($NO_x$) emissions, which have been widely used in diesel exhaust purification at present. Stricter exhaust emission regulations are introduced to limit the exhaust emissions from diesel engines to protect the environment. In order to reduce PM and $NO_x$ emissions, an exhaust after-treatment system composed of a diesel oxidation catalyst (DOC), a diesel particulate filter (DPF) and a selective catalytic reduction (SCR) unit becomes an necessary part of a diesel engine. The DOC is mainly used to reduce gaseous pollutants such as CO and THC (total hydrocarbon) present in diesel exhaust and to oxidize NO to form $NO_2$ with high oxidation activity. With a unique wall-flow structure, the DPF can efficiently trap the particulate matter in exhaust. The SCR unit is capable of catalyzing the reduction of $NO_x$ with urea as a reducing agent, thereby reducing the emissions of $NO_x$.

In the exhaust after-treatment system, as the trapping process continues, there is more soot accumulated in the DPF, resulting in rising exhaust back pressure. Therefore, the trapped soot needs to be oxidized for regeneration. The regeneration process of the DPF is mainly for oxidization of the trapped soot at a certain reaction temperature using $NO_2$. After the completion of the regeneration process, the exhaust back pressure can be significantly reduced. In addition, the conversion efficiency of SCR is affected by many factors such as $NO_2$ input concentration, reaction temperature and catalyst. It can be seen that the production and consumption of $NO_2$ stakes place throughout the entire exhaust after-treatment.

Due to less $NO_2$ directly emitted by an engine (usually, $NO_x$ accounts for less than 10% of the exhaust), the $NO_2$ required for reactions in the DPF and the SCR unit is mainly obtained by oxidizing NO with the DOC. The oxidation efficiency of the DOC to NO is mainly related to a reaction temperature and catalyst components.

The whole process of the exhaust after-treatment system includes oxidation of NO with the DOC to obtain $NO_2$, consumption of $NO_2$ at the DPF to realize oxidizing combustion of the trapped particulates, and discharge of $NO_2$ from the DPF to the SCR unit to react, thereby achieving high-efficiency conversion of $NO_2$.

Chinese patent No. 201710011098.4 discloses a method of calculation for SCR feedforward control, which determines an amount of urea injection according to a space velocity, an average SCR temperature, a ratio of $NO_2$ to $NO_x$, a mass flow rate of $NO_x$, and a concentration of urea. This method realizes accurate feedforward control of a urea injection amount with a correction factor and greatly reduces the difficulty of subsequent feedback adjustment of the urea injection amount. However, in this method, instead of the entire exhaust after-treatment system, only the SCR unit is controlled although the influence of the ratio of $NO_2$ to $NO_x$ on the chemical reaction is considered. This method has many control variables and the control accuracy needs to be improved.

SUMMARY

An objective of the present disclosure is to provide a method for controlling an exhaust after-treatment system based on $NO_2$ medium adjustment for the purpose of overcoming the defects in the prior art. The control of the exhaust after-treatment system is based on $NO_2$. Specifically, $NO_2$ demand is determined first based on desired SCR reaction efficiency; then, $NO_2$ consumption at a DPF is determined and a DOC reaction temperature is adjusted, so that $NO_2$ input after consumption at the DPF is equal to the $NO_2$ demand. The coupled synergistic effect of DOC, DPF and SCR is taken into account, thus realizing integrated control of the exhaust after-treatment system. The control method is more scientific with higher control accuracy.

The objective of the present disclosure can be achieved by the following technical solutions:

A method for controlling an exhaust after-treatment system based on $NO_2$ medium adjustment includes the following steps:

S1: creating a diesel oxidation catalyst (DOC) reaction map to obtain a relationship between a DOC reaction temperature and $NO_2$ production, creating a diesel particulate filter (DPF) reaction map to obtain a relationship between a DPF reaction temperature and a DPF differential pressure, and a $NO_2$ consumption, and creating a selective catalytic reduction (SCR) reaction map to obtain a relationship between an SCR reaction temperature and SCR reaction efficiency, and $NO_2$ demand;

S2: obtaining the SCR reaction temperature via a temperature sensor unit and obtaining the $NO_2$ demand according to the SCR reaction map based on desired SCR reaction efficiency;

S3: obtaining the DPF reaction temperature via the temperature sensor unit, obtaining the DPF differential pressure via a pressure sensor unit, and obtaining the $NO_2$ consumption based on the DPF reaction map;

S4: obtaining the $NO_2$ production with the DOC via a concentration sensor unit, and calculating a $NO_2$ input for SCR based on the $NO_2$ production and the $NO_2$ consumption;

S5: if the $NO_2$ input is equal to the $NO_2$ demand, performing step S2; otherwise, performing step S6;

S6: calculating target $NO_2$ production based on the $NO_2$ demand and the $NO_2$ consumption, obtaining a target DOC reaction temperature corresponding to the target $NO_2$ production based on the DOC reaction map, and adjusting a fuel injection rate so that the DOC reaction temperature is equal to the target DOC reaction temperature; and S7: repeating step S2 until the exhaust after-treatment system stops working.

Further, the temperature sensor unit may include one or more DOC reaction temperature sensor (s), one or more DPF reaction temperature sensor(s), and one or more SCR reaction temperature sensor (s).

Further, the concentration sensor unit may include one or more $NO_2$ concentration sensor (s) disposed at a DOC outlet.

Further, the concentration sensor unit may include one or more $NO_2$ concentration sensor(s) disposed at a DPF inlet.

Further, the pressure sensor unit may include one or more pressure sensor (s) disposed at the DPF inlet and one or more pressure sensor (s) disposed at a DPF outlet.

Further, in step S1, the creating the DOC reaction map may include the following steps:
 a1: obtaining the DOC reaction temperature;
 a2: obtaining the $NO_2$ production with the DOC;
 a3: recording the relationship between the DOC reaction temperature and the $NO_2$ production; and
 a4: repeating the previous steps until the DOC reaction temperature map is obtained.

Further, in step S1, the creating the DPF reaction map may include the following steps:
 b1: obtaining the DPF reaction temperature;
 b2: obtaining the DPF differential pressure and determining regeneration efficiency of the DPF;
 b3: obtaining the $NO_2$ consumption at the DPF;
 b4: recording the relationship between the DPF reaction temperature and the DPF differential pressure, and the $NO_2$ consumption at the DPF; and
 b5: repeating the previous steps until the DPF reaction temperature map is obtained.

Further, in step S1, the creating the SCR reaction map may include the following steps:
 c1: obtaining the $NO_2$ input;
 c2: obtaining the SCR reaction temperature;
 c3: determining the SCR reaction efficiency;
 c4: recording the relationship between the SCR reaction temperature and the SCR reaction efficiency, and the $NO_2$ input; and
 c5: repeating the previous steps until the SCR reaction temperature map is obtained.

Further, in step S4, the $NO_2$ input may be equal to a difference between the $NO_2$ production and the $NO_2$ consumption; and in step S6, the target $NO_2$ production may be equal to a sum of the $NO_2$ demand and the $NO_2$ consumption.

Further, in step S6, if a current DOC reaction temperature T1 is equal to the target DOC reaction temperature, the fuel injection rate may be kept unchanged; if the current DOC reaction temperature T1 is above the target DOC reaction temperature, the fuel injection rate may be reduced; and if the current DOC reaction temperature T1 is below the target DOC reaction temperature, the fuel injection rate may be increased.

Compared with the prior art, the present disclosure has the following advantages:

(1) The control of the exhaust after-treatment system is based on $NO_2$. Specifically, $NO_2$ demand is determined first based on desired SCR reaction efficiency; then, $NO_2$ consumption at the DPF is determined and a DOC reaction temperature is adjusted, so that a $NO_2$ input after consumption at the DPF is equal to the $NO_2$ demand. The coupled synergistic effect of DOC, DPF and SCR is taken into account, thus realizing integrated control of the exhaust after-treatment system. The control method is more scientific with higher control accuracy.

(2) The control of the entire exhaust after-treatment system is realized by adjusting the $NO_2$. With few control variables, the control method is simple and easy to realize.

(3) Due to the creation of the DOC reaction map, the DPF reaction map and the SCR reaction map are created, $NO_2$ production with the DOC, $NO_2$ consumption at the DPF and $NO_2$ demand in SCR can be determined after a reaction temperature and a DPF differential pressure are obtained during the control of the exhaust after-treatment system. Real-time control is achieved with quick response.

DETAILED DESCRIPTION

The present disclosure is now described in detail in conjunction with the accompanying drawings and a specific example. The example is implemented on the premise of the technical solutions of the present disclosure. The following presents the detailed implementation and specific operation process. The protection scope of the present disclosure, however, is not limited to the following example.

Example 1

Figure 1:
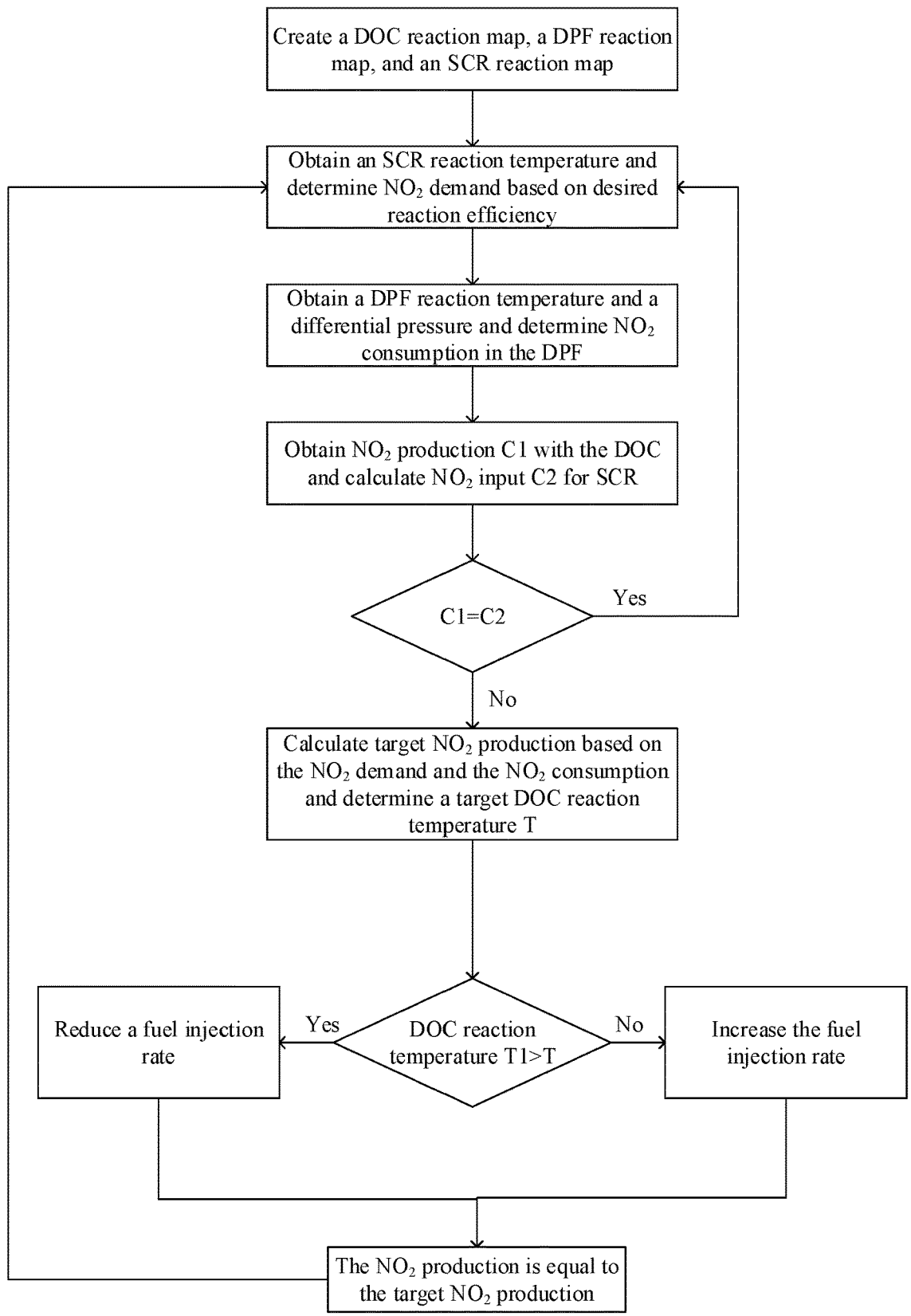
FIG. 1 is a flowchart according to an example of present disclosure.

A method for controlling an exhaust after-treatment system based on $NO_2$ medium adjustment, as shown in FIG. 1, includes the following steps:

S1: a DOC reaction map is created to obtain a relationship between a DOC reaction temperature and $NO_2$ production. The specific steps are as follows:
 a1: obtain the DOC reaction temperature;
 a2: obtain the $NO_2$ production with the DOC;
 a3: record a relationship between the DOC reaction temperature and the $NO_2$ production; and
 a4: repeat the previous steps until the DOC reaction temperature map is obtained.

The DPF reaction map is created to obtain a relationship between a DPF reaction temperature and a DPF differential pressure, and $NO_2$ consumption. The specific steps are as follows:
 b1: obtain the DPF reaction temperature;
 b2: obtain a DPF differential pressure and determining regeneration efficiency of the DPF;
 b3: obtain the $NO_2$ consumption at the DPF;
 b4: record a relationship between the DPF reaction temperature and the DPF differential pressure, and the $NO_2$ consumption at the DPF; and
 b5: repeat the previous steps until the DPF reaction temperature map is obtained.

An SCR reaction map is created to obtain a relationship between an SCR reaction temperature and SCR reaction efficiency, and $NO_2$ demand. The specific steps are as follows:
 c1: obtain the $NO_2$ input;
 c2: obtain the SCR reaction temperature;
 c3: determine the SCR reaction efficiency;
 c4: record a relationship between the SCR reaction temperature and the SCR reaction efficiency, and the $NO_2$ input; and
 c5: repeat the previous steps until the SCR reaction temperature map is obtained.

S2: the SCR reaction temperature is obtained via a temperature sensor unit and the $NO_2$ demand is obtained according to the SCR reaction map based on desired SCR reaction efficiency. The temperature sensor unit includes one or more DOC reaction temperature sensor(s), one or more DPF reaction temperature sensor(s), and one or more SCR reaction temperature sensor(s).

In this example, two DOC reaction temperature sensors, two DPF reaction temperature sensors and two SCR reaction temperature sensors are used. In other embodiments, the number of the sensors can be adjusted based on cost and accuracy.

To convert exhaust with high efficiency, the desired SCR reaction efficiency is 90% in this example. After the SCR reaction temperature, $NO_2$ input that may lead to 90% reaction efficiency of SCR at the current temperature is obtained according to the SCR reaction map. This $NO_2$ input is the $NO_2$ demand.

S3: a DPF reaction temperature is obtained via the temperature sensor unit, and a DPF differential pressure is obtained via a pressure sensor unit, and then $NO_2$ consumption is obtained based on the DPF reaction map. The pressure sensor unit includes one or more pressure sensor (s) disposed at a DPF inlet and one or more pressure sensor (s) disposed at a DPF outlet.

In this example, two pressure sensors are disposed at the DPF inlet while two pressure sensors are disposed at the DPF outlet.

S4: the $NO_2$ production with the DOC is obtained via a concentration sensor unit, and the $NO_2$ input for SCR is calculated based on the $NO_2$ production and the $NO_2$ consumption. The $NO_2$ input is equal to a difference between the $NO_2$ production and the $NO_2$ consumption. The concentration sensor unit includes one or more $NO_2$ concentration sensor (s) disposed at the DOC outlet. Since the DOC outlet is connected to the DPF inlet, the concentration sensor unit may also include one or more $NO_2$ concentration sensor (s) disposed at the DPF inlet.

In this example, two $NO_2$ concentration sensors are disposed at the DOC outlet.

S5: if the $NO_2$ input is equal to the $NO_2$ demand, indicating no need to adjust a working state of each component, step S2 is performed; otherwise, step S6 is performed and the working state is adjusted.

If the $NO_2$ input is greater than the $NO_2$ demand, it indicates that the $NO_2$ input exceeds the $NO_2$ demand for keeping 90% reaction efficiency of SCR at this reaction temperature. In this case, the $NO_x$ conversion efficiency of SCR will be suppressed. Therefore, the $NO_2$ input and the DOC reaction temperature both need to be reduced so that the $NO_2$ production decreases.

If the $NO_2$ input is less than the $NO_2$ demand, it indicates that the $NO_2$ input does not reach the $NO_2$ demand for keeping 90% reaction efficiency of SCR at this reaction temperature. Therefore, the $NO_2$ input and the DOC reaction temperature both need to be increased so that the $NO_2$ production increases.

S6: target $NO_2$ production is calculated based on the $NO_2$ demand and the $NO_2$ consumption, where the target $NO_2$ production is equal to a sum of the $NO_2$ demand and the $NO_2$ consumption. A target DOC reaction temperature corresponding to the target $NO_2$ production is then obtained based on the DOC reaction map, and the current DOC reaction temperature is adjusted to the target DOC reaction temperature to control the $NO_2$ production with the DOC to be same as the target $NO_2$ production.

Figure 2:
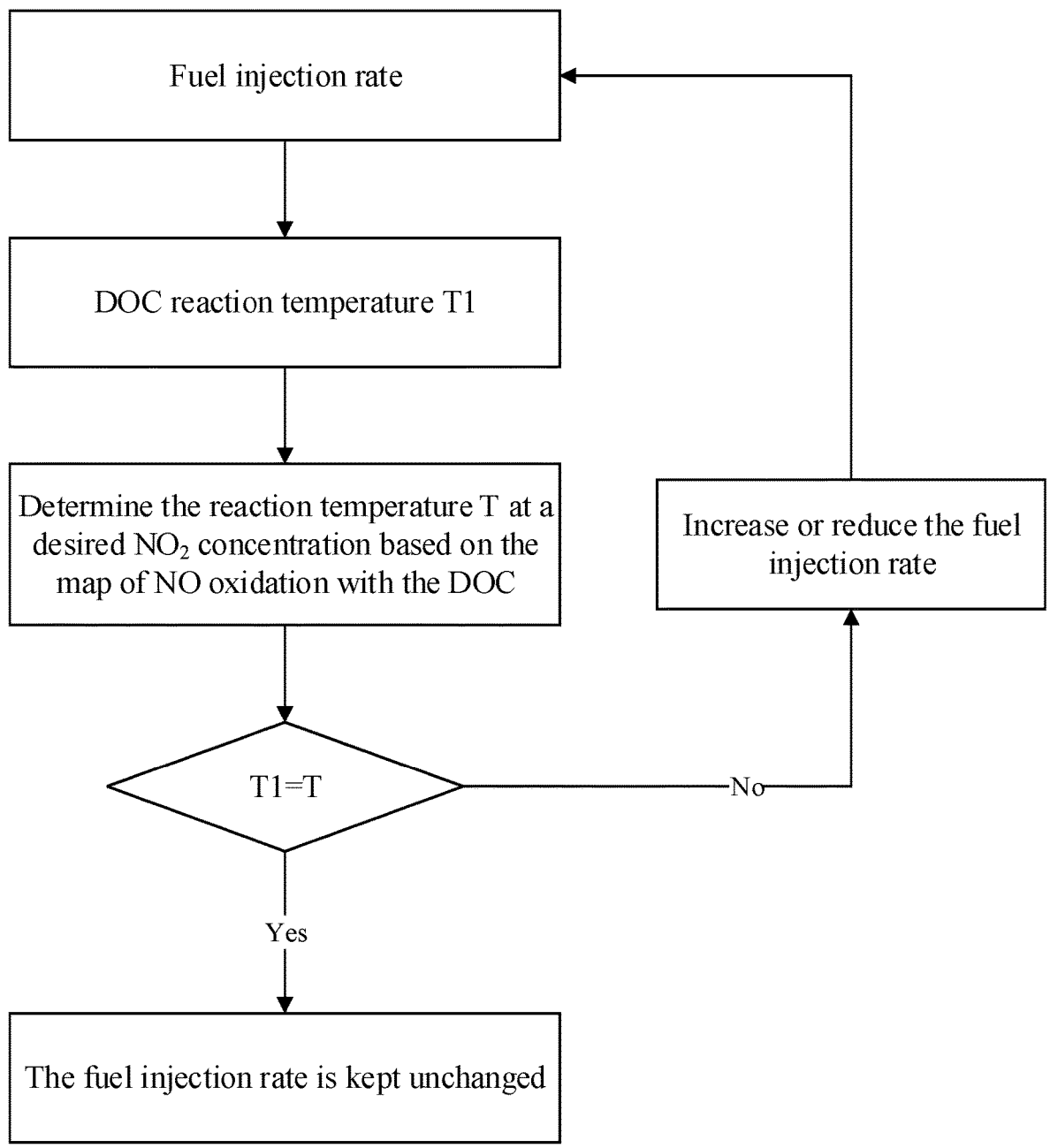
FIG. 2 is a schematic diagram of DOC temperature control according to an example of present disclosure.

As shown in FIG. 2, if the current DOC reaction temperature T1 is equal to the target DOC reaction temperature, a fuel injection rate of a tail pipe is kept unchanged. If the current DOC reaction temperature T1 is above the target DOC reaction temperature, the fuel injection rate of the tail pipe is reduced so as to reduce the reaction temperature and increase an oxidation rate of NO. If the current DOC reaction temperature T1 is below the target DOC reaction temperature, the fuel injection rate of the tail pipe is increased so as to increase the reaction temperature and reduce the oxidation rate of NO.

S7: step S2 is repeated until the exhaust after-treatment system stops working.

The foregoing is detailed description of the preferred specific example of the present disclose. It should be understood that a person of ordinary skill in the art can make various modifications and variations according to the concept of the present invention without creative efforts. Therefore, all technical solutions that a person skilled in the art can arrive at based on the prior art through logical analysis, reasoning, or finite experiments according to the concept of the present invention shall fall within the protection scope defined by the appended claims.

What is claimed is:

1. A method for controlling an exhaust after-treatment system based on $NO_2$ medium adjustment, comprising the following steps:

S1: creating a diesel oxidation catalyst (DOC) reaction map to obtain a relationship between a DOC reaction temperature and $NO_2$ production, creating a diesel particulate filter (DPF) reaction map to obtain a relationship between a DPF operation temperature and a DPF differential pressure, and $NO_2$ consumption, and creating a selective catalytic reduction (SCR) reaction map to obtain a relationship between an SCR reaction temperature and an SCR reaction efficiency, and $NO_2$ demand;

S2: detecting an SCR reaction temperature of an SCR via a temperature sensor unit and obtaining a $NO_2$ demand according to the SCR reaction map based on the detected SCR reaction temperature in order to achieve a desired SCR reaction efficiency;

S3: detecting a DPF operation temperature of a DPF via the temperature sensor unit and detecting a DPF differential pressure of the DPF via a pressure sensor unit, and obtaining a $NO_2$ consumption of the DPF according to the DPF reaction map based on the detected DPF operation temperature and the detected DPF differential pressure;

S4: detecting a $NO_2$ production by a DOC via a concentration sensor unit, and calculating a $NO_2$ input to the SCR based on the $NO_2$ production of the DOC and the $NO_2$ consumption of the DPF;

S5: if the $NO_2$ input is equal to the $NO_2$ demand, performing step S2 to step S4; otherwise, performing step S6; and S6: calculating a target $NO_2$ production based on the $NO_2$ demand and the $NO_2$ consumption, obtaining a target DOC reaction temperature corresponding to the target $NO_2$ production based on the DOC reaction map, and adjusting a fuel injection rate so that the DOC reaction temperature is equal to the target DOC reaction temperature, wherein the DOC reaction temperature is controlled by regulating the fuel injection rate and the $NO_2$ production by the DOC is controlled through regulating the fuel injection rate to control the target DOC reaction temperature such that the $NO_2$ production by the DOC is equal to the target $NO_2$ production.

2. The method according to claim 1, wherein the temperature sensor unit comprises one or more DOC reaction temperature sensor(s), one or more DPF operation temperature sensor(s), and one or more SCR reaction temperature sensor(s).

3. The method according to claim 1, wherein the concentration sensor unit comprises one or more $NO_2$ concentration sensor(s) disposed at a DOC outlet.

4. The method according to claim 1, wherein the concentration sensor unit comprises one or more $NO_2$ concentration sensor(s) disposed at a DPF inlet.

5. The method according to claim 1, wherein the pressure sensor unit comprises one or more pressure sensor(s) disposed at a DPF inlet and one or more pressure sensor(s) disposed at a DPF outlet.

6. The method according to claim 1, wherein in step S1, the creating the DOC reaction map comprises the following steps:
   a1: obtaining the DOC reaction temperature;
   a2: obtaining the $NO_2$ production with the DOC;
   a3: recording the relationship between the DOC reaction temperature and the $NO_2$ production; and
   a4: repeating the previous steps until the DOC reaction temperature map is obtained.

7. The method according to claim 1, wherein in step S1, the creating the DPF reaction map comprises the following steps:
   b1: obtaining the DPF operation temperature;
   b2: obtaining the DPF differential pressure and determining regeneration efficiency of the DPF;
   b3: obtaining the $NO_2$ consumption at the DPF;
   b4: recording the relationship between the DPF operation temperature and the DPF differential pressure, and the $NO_2$ consumption at the DPF; and
   b5: repeating the previous steps until the DPF reaction temperature map is obtained.

8. The method according to claim 1, wherein in step S1, the creating the SCR reaction map comprises the following steps:
   c1: obtaining the $NO_2$ input;
   c2: obtaining the SCR reaction temperature;
   c3: determining the SCR reaction efficiency;
   c4: recording the relationship between the SCR reaction temperature and the SCR reaction efficiency, and the $NO_2$ input; and
   c5: repeating the previous steps until the SCR reaction temperature map is obtained.

9. The method according to claim 1, wherein in step S4, the $NO_2$ input is equal to a difference between the $NO_2$ production and the $NO_2$ consumption; and in step S6, the target $NO_2$ production is equal to a sum of the $NO_2$ demand and the $NO_2$ consumption.

10. The method according to claim 1, wherein in step S6, if a current DOC reaction temperature $T1$ is equal to the target DOC reaction temperature, the fuel injection rate is kept unchanged; if the current DOC reaction temperature $T1$ is above the target DOC reaction temperature, the fuel injection rate is reduced; and if the current DOC reaction temperature $T1$ is below the target DOC reaction temperature, the fuel injection rate is increased.

* * * * *